United States Patent
Lee (10) Patent No.: US 8,850,222 B2
(45) Date of Patent: Sep. 30, 2014

(54) ELECTRONIC APPARATUS, DISPLAY DRIVING APPARATUS, AND DIGITAL CONTENT DISPLAY METHOD THEREOF

(75) Inventor: Tzung-Yuan Lee, Taichung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 733 days.

(21) Appl. No.: 12/844,842

(22) Filed: Jul. 28, 2010

(65) Prior Publication Data

US 2011/0314299 A1    Dec. 22, 2011

(30) Foreign Application Priority Data

Jun. 22, 2010   (TW) ............................... 99120286 A (51) Int. Cl.
*H04L 9/00*     (2006.01)
*G09G 5/00*     (2006.01)

(52) U.S. Cl.
USPC ........... 713/188; 713/168; 713/171; 713/189; 380/239; 380/240; 380/255

(58) Field of Classification Search
None
See application file for complete search history.

(56) References Cited

U.S. PATENT DOCUMENTS

2004/0225890 A1*  11/2004  Kang et al. .................... 713/193
2005/0005104 A1*   1/2005  Hanks ........................... 713/165

FOREIGN PATENT DOCUMENTS

| CN | 101212633 | 7/2008 |
|---|---|---|
| CN | 101251880 | 8/2008 |
| CN | 101437143 | 5/2009 |
| CN | 101656818 | 2/2010 |
| TW | 201021590 | 6/2010 |
| TW | 201023047 | 6/2010 |

OTHER PUBLICATIONS http://www.verisign.com/stellent/groups/public/documents/guides/005326.pdf "Digital ID"—Jul. 2009, Verisign.*
http://www.giac.org/cissp-papers/52.pdf "Explanation of the Three Types of Cryptosystems"— Eric Conrad, GIAC, Jun. 2008.*
"Office Action of Taiwan Counterpart Application", issued on Apr. 24, 2013, pp. 1-9.
"First Office Action of China Counterpart Application", issued on Jan. 29, 2013, p1-p8.

* cited by examiner

*Primary Examiner* — Randy Scott
(74) *Attorney, Agent, or Firm* — Jianq Chyun IP Office (57) ABSTRACT

A digital content display method adaptable to an electronic apparatus is provided. The electronic apparatus includes a display interface and a display driving apparatus. The digital content display method includes following steps. An encrypted digital content is received by the display driving apparatus. The encrypted digital content is decrypted by the display driving apparatus according to an algorithm. The display interface of the electronic apparatus is driven by the display driving apparatus according to the decrypted digital content so that the display interface displays the digital content. Additionally, an electronic apparatus and a display driving apparatus thereof are also provided.

11 Claims, 9 Drawing Sheets

ELECTRONIC APPARATUS, DISPLAY DRIVING APPARATUS, AND DIGITAL CONTENT DISPLAY METHOD THEREOF

CROSS-REFERENCE TO RELATED APPLICATION

This application claims the priority benefit of Taiwan application serial No. 99120286, filed on Jun. 22, 2010. The entirety of each of the above-mentioned patent applications is hereby incorporated by reference herein and made a part of this specification.

BACKGROUND OF THE INVENTION

1. Field of the Invention

The invention generally relates to an electronic apparatus, a display driving apparatus, and a digital content display method thereof, and more particularly, to an electronic apparatus, a display driving apparatus, and a digital content display method thereof with a digital content protection mechanism.

2. Description of Related Art

In this information era, communication networks deployed across the world not only provide a convenient communication channel but also allow people to download network resources, play digital videos, or even read e-books through electronic apparatuses at anytime and anywhere. These communication networks make today's life more interesting and colourful and provide a very convenient way for people to exchange information.

In order to avoid any copyright related issue (for example, unauthorized copy, use, or distribution of data) that may arise when network resources are downloaded through electronic apparatuses, how to protect digital contents available online has become one of the major subjects to electronic product manufacturers.

Since digital contents are easily copied and distributed, a digital rights management (DRM) technology for protecting digital contents has been developed recently. In short, a DRM technique is to encrypt a digital content and restrict the distribution channel thereof by only allowing authorized electronic apparatuses to access it. In other words, both the play and transmission of a digital content protected by the DRM mechanism are restricted to a certain extent. Thereby, the copyright of the digital content is protected and the digital content is prevented from being misappropriated.

In addition, the display driving apparatus of a liquid crystal display (LCD), an organic light emitting diode (OLED) display, or a light emitting transistor (LET) display is usually composed of a source driver, a gate driver, an analog-to-digital converter (ADC), a buck or boost circuit, a digital control circuit, and other analog circuits. Generally speaking, a source driver or a gate driver usually has dozens or even hundreds of channels. Thus, a display driving apparatus can coordinate the control states of the source driver and the gate driver. A large display is usually equipped with a digital set-top box, a built-in video signal decoder chip, or an external video decoder in order to receive continuous video signals. Since an additional chip or device has to be disposed for receiving and display video data, the hardware cost is high. Besides, the decoded video data may be captured before it is sent to the display driving apparatus.

Figure 1:
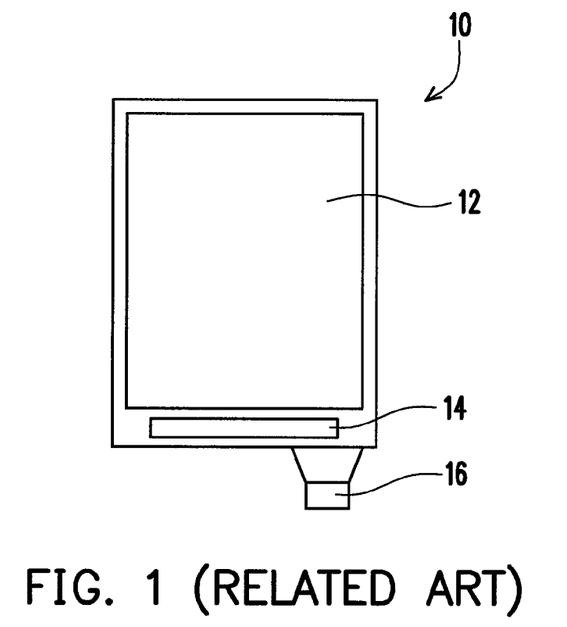
FIG. 1 illustrates a display of a handheld apparatus.

FIG. 1 illustrates a display of a handheld apparatus. Referring to FIG. 1, the display 10 includes a panel body 12 (a LCD panel or an OLED panel), a display driving apparatus 14 (a single highly integrated display driver chip is usually adopted in a small handheld apparatus), and a flexible printed circuit (FPC) 16. The FPC 16 has a connector and a few voltage stabilizing circuits and can be connected with an external central processing unit (CPU), microcontroller, or display chip.

A display driver chip of a handheld apparatus is a highly integrated chip, and which usually includes a source driver, a gate driver, a digital control circuit, a power conversion circuit, and a digital-to-analog converter (DAC). All of foregoing circuits are integrated into a single chip.

Figure 2:
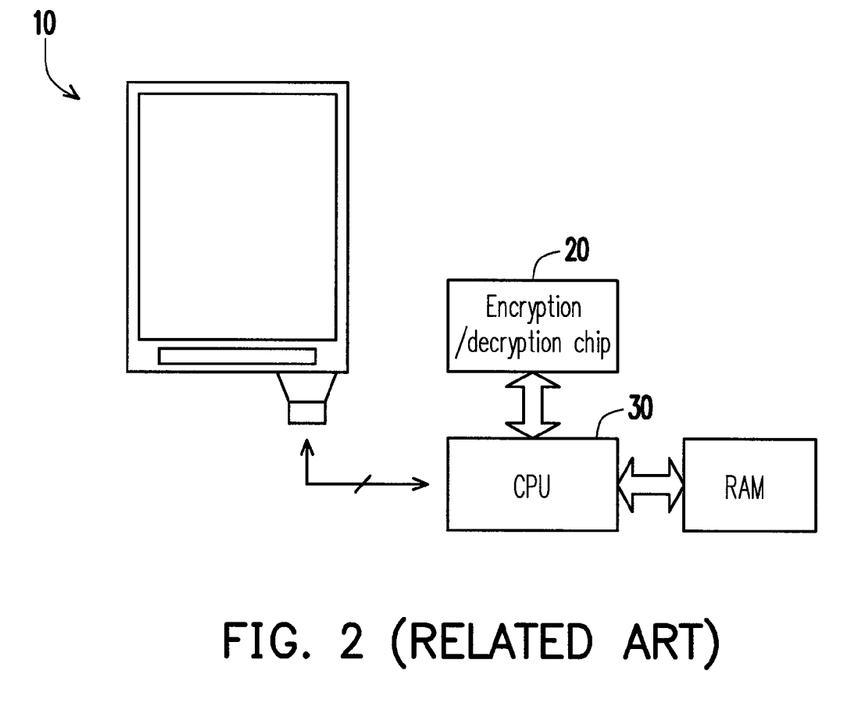
FIG. 2 is a diagram of a handheld or non-handheld apparatus.

FIG. 2 is a diagram of a handheld or non-handheld apparatus. Referring to FIG. 2, a special encryption/decryption chip 20 is disposed by the manufacturer to display a protected digital content. The encryption/decryption chip 20 increases not only the hardware cost but the power consumption and surface area of the handheld apparatus 10. In addition, decoded data may be easily captured between the external CPU 30 and the display by an external device. Thus, the digital content to be displayed may be misappropriated. This is because the signals and communication information to be sent by the CPU or display chip to the driver chip of the display are usually not encrypted. Even if an encrypted data is sent, the data is usually encrypted in an encryption format common to the industry and a corresponding decryption method can be easily obtained from a manufacturer.

If no additional encryption/decryption chip is disposed and instead, the encryption algorithm is written into a program in the CPU, the operation load of the CPU is increased, and the software encryption algorithm in the CPU may be easily cracked by a reversed engineering technique. Besides, as described above, the decoded data may be captured between the external CPU and the display by an external device. Thus, digital contents cannot be effectively protected.

SUMMARY OF THE INVENTION

Accordingly, the invention is directed to a digital content display method, wherein a corresponding encryption or decryption method is adopted according to the identification information of an electronic apparatus, so that a digital content to be displayed is protected from being misappropriated by any unauthorized electronic apparatus.

The invention is directed to an electronic apparatus using aforementioned digital content display method, wherein a digital content protection mechanism is adopted such that a digital content to be displayed is protected from being misappropriated by any unauthorized electronic apparatus.

The invention is directed to a display driving apparatus using aforementioned digital content display method, wherein a digital content protection mechanism is adopted such that a digital content to be displayed is protected from being misappropriated by any unauthorized electronic apparatus.

The invention provides a digital content display method adaptable to an electronic apparatus, wherein the electronic apparatus includes a display interface and a display driving apparatus. The digital content display method includes following steps. An encrypted digital content is received by the display driving apparatus. The digital content is decrypted according to a first algorithm by the display driving apparatus. The display interface of the electronic apparatus is driven according to the decrypted digital content by the display driving apparatus so that the display interface displays the digital content.

According to an embodiment of the invention, the digital content display method further includes providing an identification information to a remote apparatus by the display driving apparatus before the step of receiving the encrypted digital content, wherein the identification information is corresponding to the display driving apparatus, and the remote apparatus encrypts the digital content according to the first algorithm corresponding to the identification information and provides the encrypted digital content to the electronic apparatus.

According to an embodiment of the invention, before the step of providing the identification information to the remote apparatus, the digital content display method further includes encrypting the identification information by the display driving apparatus. In the step of providing the identification information to the remote apparatus, the encrypted identification information and a security key are provided to the remote apparatus by the display driving apparatus, wherein the remote apparatus decrypts the identification information by the security key.

According to an embodiment of the invention, before the step of providing the encrypted identification information and the security key to the remote apparatus, the digital content display method further includes encrypting the security key by the display driving apparatus. In the step of providing the identification information to the remote apparatus, the encrypted identification information and the encrypted security key are provided to the remote apparatus by the display driving apparatus, wherein the remote apparatus decrypts the security key according to a second algorithm.

According to an embodiment of the invention, before the step of providing the encrypted identification information and the encrypted security key to the remote apparatus, the digital content display method further includes converting the encrypted identification information and the encrypted security key into a data stream by the display driving apparatus. In the step of providing the identification information to the remote apparatus, the data stream is provided to the remote apparatus by the display driving apparatus.

According to an embodiment of the invention, before the step of providing the data stream to the remote apparatus by the display driving apparatus, the digital content display method further includes encrypting the data stream by the display driving apparatus. In the step of providing the identification information to the remote apparatus, the encrypted data stream is provided to the remote apparatus by the display driving apparatus, wherein the remote apparatus decrypts the data stream according to a third algorithm.

According to an embodiment of the invention, the electronic apparatus further includes a processing unit and a network connecting apparatus. Before the step of providing the identification information to the remote apparatus, the digital content display method further includes following steps. A connection is established with the remote apparatus by the network connecting apparatus. The display driving apparatus is requested to provide the identification information by the processing unit. In the step of providing the identification information to the remote apparatus, the identification information is provided to the remote apparatus by the processing unit and the network connecting apparatus.

According to an embodiment of the invention, the display driving apparatus includes a memory. The digital content display method further includes storing the security key corresponding to the digital content by the memory so as to allow a user to browse the digital content offline.

The invention provides an electronic apparatus adapted to display a digital content provided by a remote apparatus. The electronic apparatus includes a display interface and a display driving apparatus. The display interface displays the digital content. The display driving apparatus receives the encrypted digital content, decrypts the digital content according to a first algorithm, and drives the display interface according to the decrypted digital content so as to allow the display interface to display the digital content.

The invention provides a display driving apparatus adapted to drive a display interface to display a digital content provided by a remote apparatus. The display driving apparatus includes an encryption/decryption unit and a display driving unit. The encryption/decryption unit receives the encrypted digital content and decrypts the digital content according to a first algorithm. The display driving unit drives the display interface according to the decrypted digital content so as to allow the display interface to display the digital content.

As described above, in an embodiment of the invention, before an electronic apparatus receives a digital content, the electronic apparatus provides the identification information of a display driving apparatus to a remote apparatus so that the remote apparatus can encrypt the digital content according to an algorithm corresponding to the identification information. Thereby, the digital content is protected from any authorized electronic apparatus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to protect the digital copyright of a digital content, before an electronic apparatus receives the digital content, a remote apparatus encrypts the digital content according to the identification information of the electronic apparatus so that the digital content can only be played in this electronic apparatus. Thereby, the digital content is protected from being misappropriated by any unauthorized electronic apparatus, and a digital rights management (DRM) purpose is accomplished.

The invention provides a digital content display method based on the theory described above, so as to prevent a digital content from being misappropriated by any unauthorized electronic apparatus. Embodiments of the invention will be described below with reference to accompanying drawings.

In following embodiments, a portable electronic apparatus, such as a notebook computer, an e-book player, or a handheld communication device, will be described as an example. However, it should be understood by those having ordinary knowledge in the art that the electronic apparatus in the invention is not limited to a portable electronic apparatus, and in other embodiments, the electronic apparatus may be any electronic apparatus with a digital content display function, such as a desktop computer. In addition, the type of the digital content is not limited in the invention, and any type of digital content, such as a dynamic digital content, a static digital content, an audio, a video, a 2-dimensional (2D) image animation, or a 3-dimensional (3D) image animation, is within the scope of the invention.

Figure 3:
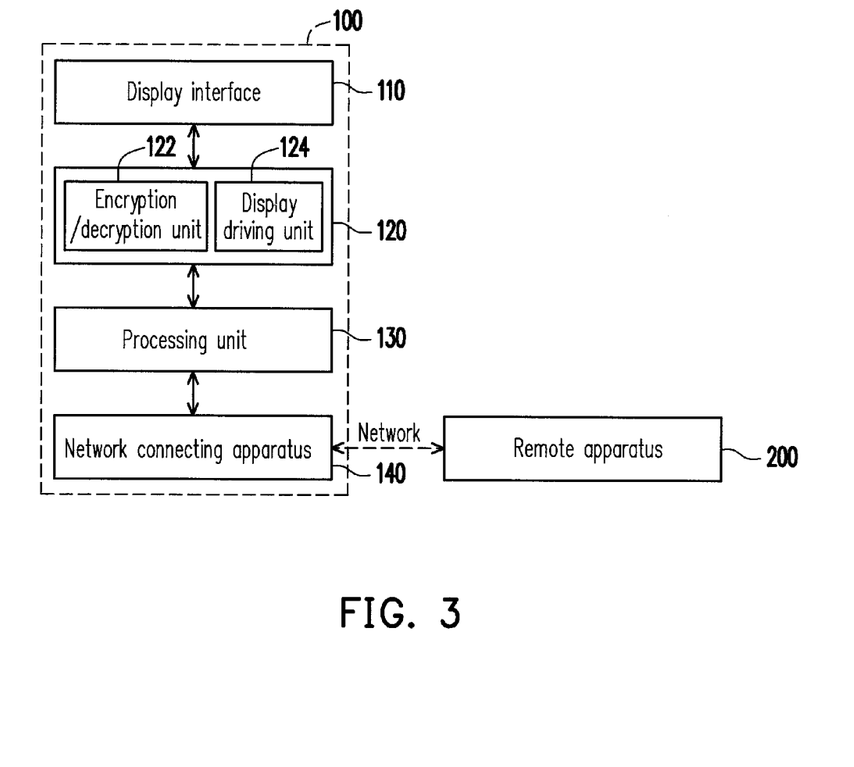
FIG. 3 is a schematic block diagram of an electronic apparatus with a digital content protection mechanism according to an embodiment of the invention.

FIG. 3 is a schematic block diagram of an electronic apparatus with a digital content protection mechanism according to an embodiment of the invention. Referring to FIG. 3, in the present embodiment, the electronic apparatus 100 includes a display interface 110, a display driving apparatus 120, a processing unit 130, and a network connecting apparatus 140.

In the present embodiment, the electronic apparatus 100 receives a digital content from a remote apparatus 200. The digital content may be a music file or a static image file. However, the type of the digital content is not limited herein.

Before receiving the digital content, the electronic apparatus 100 provides the identification information of the display driving apparatus 120 to the remote apparatus 200 so that the remote apparatus 200 can encrypt the digital content by a corresponding algorithm according to the identification information of the display driving apparatus 120. After receiving the encrypted digital content, the display driving apparatus 120 of the electronic apparatus 100 decrypts the digital content according to the corresponding algorithm so as to display the digital content.

Herein the identification information of the display driving apparatus 120 may be the model number of the display driving apparatus 120 or any identification information configured when the display driving apparatus 120 is designed.

In the present embodiment, the remote apparatus 200 encrypts the digital content to be received by the electronic apparatus 100 to make sure that the digital content can only be played by the electronic apparatus 100. Thereby, the digital content is protected from being misappropriated by any unauthorized electronic apparatus, and a DRM purpose is accomplished.

In the present embodiment, the electronic apparatus 100 may be an e-book player. In this case, the electronic apparatus 100 downloads the digital content of an e-book from a remote apparatus (for example, a service platform of an online book store) provided by the supplier of the e-book through a wired or wireless communication network. Before the electronic apparatus 100 downloads the e-book, the remote apparatus encrypts the digital content of the e-book according to the identification information of the display driving apparatus 120 of the electronic apparatus 100 so that the digital content won't be misappropriated by any unauthorized electronic apparatus.

In the present embodiment, the electronic apparatus 100 may also be a multimedia player. In this case, the electronic apparatus 100 downloads the digital content of an audio/video file from a remote apparatus (for example, a service platform of a multimedia file exchange website) provided by a multimedia supplier through a wired or wireless communication network. Before the electronic apparatus 100 downloads the audio/video file, the remote apparatus encrypts the digital content of the audio/video file according to the identification information of the display driving apparatus 120 of the electronic apparatus 100 so that the digital content won't be misappropriated by any unauthorized electronic apparatus.

To be specific, in the present embodiment, the network connecting apparatus 140 establishes a connection with the remote apparatus 200. The processing unit 130 requests the display driving apparatus 120 to provide the identification information and the network connecting apparatus 140 to establish the connection with the remote apparatus 200. Herein the processing unit 130 may be a central processing unit (CPU) or a microprocessor control unit (MCU).

Because the critical encryption and decryption steps are carried out in the display driving apparatus and the remote apparatus, how the data stream is encrypted and decrypted cannot be understood even though the data stream is captured in the processing unit. Accordingly, the security of the digital content is ensured.

The display interface 110 displays the digital content. The display driving apparatus 120 receives the encrypted digital content and decrypts the digital content according to the algorithm that is used by the remote apparatus 200 for encrypting the digital content, and the display driving apparatus 120 drives the display interface 110 according to the decrypted digital content so that the display interface 110 displays the digital content.

The display driving apparatus 120 includes an encryption/decryption unit 122 and a display driving unit 124. The encryption/decryption unit 122 receives the encrypted digital content and decrypts the digital content according to the algorithm that is used by the remote apparatus 200 for encrypting the digital content. The display driving unit 124 drives the display interface 110 according to the decrypted digital content so that the display interface 110 displays the digital content.

In the present embodiment, the display driving apparatus 120 includes at least one algorithm for decrypting the digital content, at least one algorithm for decrypting a security key provided by the remote apparatus 200, at least one algorithm for encrypting the security key of the display driving apparatus 120, or at least one algorithm for encrypting/decrypting the data stream.

The display driving apparatus 120 can store a security key exclusively corresponding to the digital content according to the actual implementation requirement so that a user can browse the digital content offline.

It should be noted that in the present embodiment, the encryption and decryption operations performed on the digital content provided by the remote apparatus 200 and the identification information of the display driving apparatus 120 are all executed by the display driving apparatus 120 of the electronic apparatus 100, while the processing unit 130 simply transmits data related to the digital content and executes a transmission initiating procedure.

Figure 4:
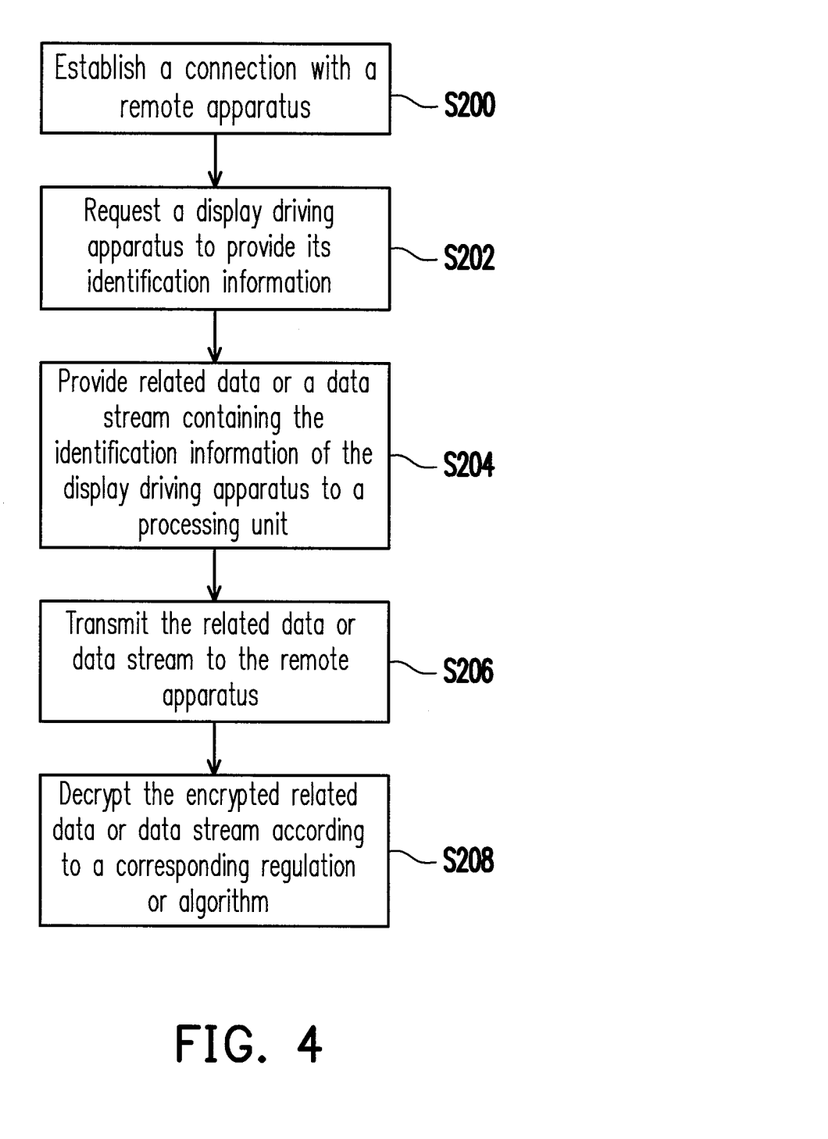
FIG. 4 is a flowchart of a digital content display method according to an embodiment of the invention, wherein how the electronic apparatus in FIG. 3 transmits encrypted data to a remote apparatus is illustrated.

FIG. 4 is a flowchart of a digital content display method according to an embodiment of the invention, wherein how the electronic apparatus in FIG. 3 transmits encrypted data to the remote apparatus is illustrated.

Referring to FIG. 3 and FIG. 4, first, in step S200, when the electronic apparatus 100 is about to download a digital content from the remote apparatus 200, the processing unit 130 requests the network connecting apparatus 140 to establish a connection with the remote apparatus 200. Herein the network connecting apparatus 140 may be a wireless network connecting apparatus or a wired network connecting apparatus.

In the present embodiment, the electronic apparatus 100 is connected to the remote apparatus 200 (for example, a host system provided by a telecommunication service provider that offers a download service) through a wireless communication network and downloads the digital content from the remote apparatus 200 according to, for example, the Wireless Application Protocol (WAP). Besides, the electronic apparatus 100 may also be connected to a web server through the Internet and download the digital content from the web server.

Then, in step S202, the processing unit 130 requests the display driving apparatus 120 to provide its identification information. The identification information may be the model number of the display driving apparatus 120 or any identification information configured when the display driving apparatus 120 is designed.

Herein, the processing unit 130 may request the display driving apparatus 120 to provide its identification information in an encrypted or unencrypted form according to a communication protocol or regulation specified by an application program. After the remote apparatus 200 receives the encrypted or unencrypted identification information, it communicates with the display driving apparatus 120 by the corresponding encryption/decryption technique.

Thus, in step S204, after receiving the request from the processing unit 130, the display driving apparatus 120 provides related data containing at least its identification information to the processing unit 130, wherein the related data may be encrypted or unencrypted. If the related data is encrypted, it may or may not be decryptable to the processing unit 130.

Next, in step S206, after obtaining the related data containing at least the identification information of the display driving apparatus 120, the processing unit 130 transmits the related data to the remote apparatus 200 through the network connecting apparatus 140.

In the present embodiment, the processing unit 130 converts the related data provided by the display driving apparatus 120 into a data stream in a specific format according to a regulation or method provided by the application program. After that, the processing unit 130 transmits the data stream to the remote apparatus 200 through the network connecting apparatus 140. Besides, the processing unit 130 may transmit the related data or the data stream to the remote apparatus 200 in an encrypted or unencrypted manner.

Thereafter, in step S208, after receiving the encrypted or unencrypted related data or data stream, the remote apparatus 200 decrypts the related data or data stream according to the corresponding regulation or algorithm and then interprets the related data or data stream to obtain the identification information of the display driving apparatus 120.

After obtaining the identification information of the display driving apparatus 120, the remote apparatus 200 communicates with the display driving apparatus 120 according to the encryption/decryption algorithm, transmission regulation, or communication protocol corresponding to the display driving apparatus 120. For example, the remote apparatus 200 encrypts the digital content to be received by the electronic apparatus 100 according to a first algorithm corresponding to the identification information of the display driving apparatus 120.

Based on the digital content display method provided by an embodiment of the invention, the remote apparatus 200 encrypts or decrypts a digital content to be received by the electronic apparatus 100 according to the identification information of the display driving apparatus 120, so that the digital content can only be played in the electronic apparatus 100. Thus, the digital content is prevented from being misappropriated by any unauthorized electronic apparatus, and a DRM purpose is accomplished.

It should be noted that in step S204, the display driving apparatus 120 provides the related data containing at least its identification information to the processing unit 130 after it receives the request of the processing unit 130, wherein the related data may be encrypted or unencrypted.

Figure 5:
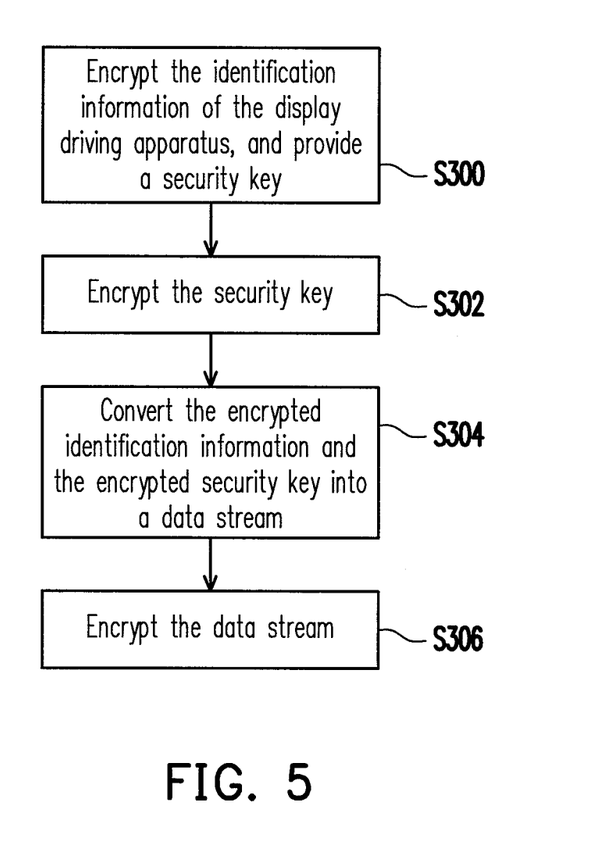
FIG. 5 is a flowchart illustrating how a display driving apparatus encrypts the identification information thereof according to an embodiment of the invention.

FIG. 5 is a flowchart illustrating how a display driving apparatus encrypts the identification information thereof according to an embodiment of the invention. Referring to FIGS. 3-5, in the present embodiment, the related data provided by the display driving apparatus 120 to the processing unit 130 is an encrypted data stream. However, the invention is not limited thereto.

In the present embodiment, the display driving apparatus 120 includes at least one algorithm for decrypting a digital content, at least one algorithm for decrypting a security key provided by the remote apparatus 200, at least one algorithm for encrypting the security key of the display driving apparatus 120, or at least one algorithm for encrypting/decrypting the data stream.

Accordingly, in step S300, the display driving apparatus 120 encrypts its identification information before it provides the identification information to the processing unit 130. Herein the related data provided by the display driving apparatus 120 contains at least the encrypted identification information and a security key, wherein the remote apparatus 200 decrypts the identification information of the display driving apparatus 120 by the security key.

In step S302, the display driving apparatus 120 further encrypts the security key. Herein the related data provided by the display driving apparatus 120 contains at least the encrypted identification information and the encrypted security key, wherein the remote apparatus 200 decrypts the security key according to a corresponding algorithm (for example, a second algorithm).

Next, in step S304, the display driving apparatus 120 converts the encrypted identification information and the encrypted security key into a data stream. Herein the data stream provided by the display driving apparatus 120 contains at least the encrypted identification information and the encrypted security key.

After that, in step S306, the display driving apparatus 120 encrypts the data stream. Herein the display driving apparatus 120 provides the encrypted data stream to the processing unit 130, wherein the remote apparatus 200 decrypts the data stream according to a corresponding algorithm (for example, a third algorithm).

After the identification information is encrypted, if the display driving apparatus 120 receives a request from the processing unit 130, the display driving apparatus 120 provides the data stream containing the encrypted identification information and the encrypted security key to the processing unit 130, wherein the data stream is encrypted.

It should be noted that in the procedures illustrated in FIG. 4 and FIG. 5, the algorithms for encrypting and decrypting the identification information, the security key, and the data stream may be the same algorithm or different algorithms.

In the present embodiment, the encryption operations are executed by the display driving apparatus 120, while the decryption operations are executed by the remote apparatus 200. Thus, even if the related data is captured by an unauthorized electronic apparatus on its transmission path, the related data cannot be decrypted since the corresponding algorithm is not known.

Figure 6:
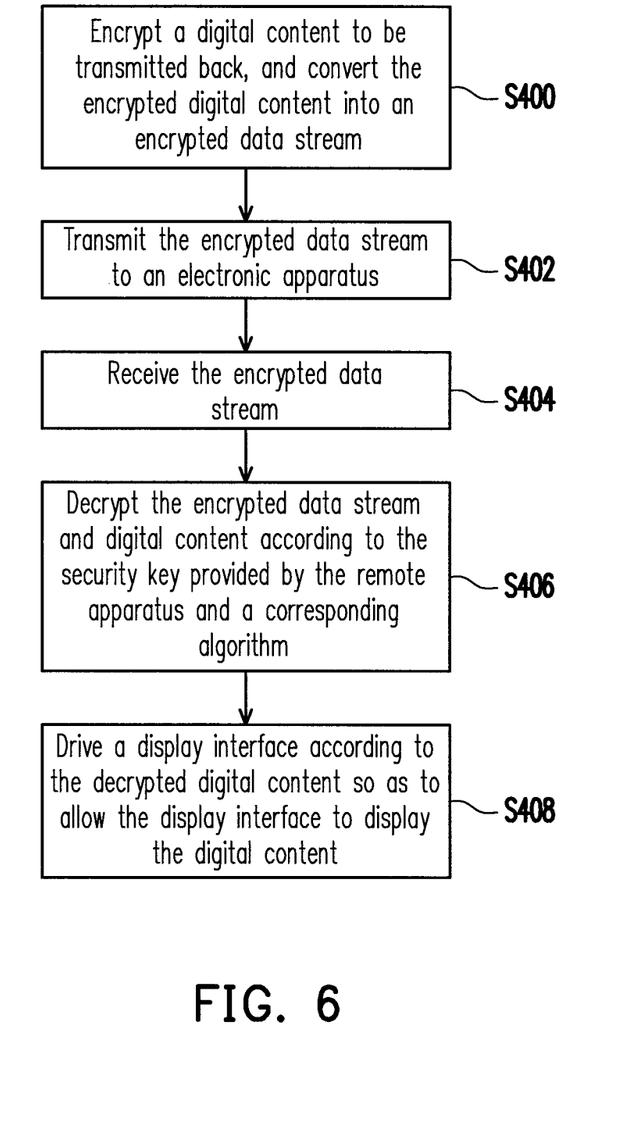
FIG. 6 is a flowchart of a digital content display method according to an embodiment of the invention, wherein how a remote apparatus in FIG. 3 transmits encrypted data to the electronic apparatus in FIG. 3 is illustrated.

FIG. 6 is a flowchart of a digital content display method according to an embodiment of the invention, wherein how the remote apparatus in FIG. 3 transmits encrypted data to the electronic apparatus in FIG. 3 is illustrated. Referring to FIG. 3, FIG. 4, and FIG. 6, after receiving the identification information of the display driving apparatus 120, the remote apparatus 200 transmits the digital content to be displayed by the electronic apparatus 100 back to the electronic apparatus 100.

In step S400, the remote apparatus 200 encrypts the digital content to be transmitted back to the electronic apparatus 100. In the present embodiment, the remote apparatus 200 transmits an encrypted data stream back to the electronic apparatus 100. It should be noted that because the data stream to be transmitted by the remote apparatus 200 contains the digital content to be protected, the remote apparatus 200 encrypts the digital content and the data stream before it transmits the data stream, wherein the digital content and the data stream may be encrypted according to different algorithms.

For example, based on the performance of the remote apparatus 200, the remote apparatus 200 can encrypt the packet information, essential handshaking control, or state information of the data stream according to a specific algorithm and encrypt the digital content to be actually protected in the data stream according to another algorithm.

Since the remote apparatus 200 has obtained the identification information of the display driving apparatus 120, the remote apparatus 200 encrypts the digital content and the data stream according to an algorithm corresponding to the display driving apparatus 120 or even provides a new security key, so that the display driving apparatus 120 can decrypt the digital content and the data stream according to a corresponding algorithm.

Then, in step S402, the remote apparatus 200 transmits the encrypted data stream to the electronic apparatus 100.

Next, in step S404, the electronic apparatus 100 receives the encrypted data stream through the connection established between the network connecting apparatus 140 and the remote apparatus 200.

In step S404, the processing unit 130 receives the encrypted data stream from the network connecting apparatus 140 and transmits the encrypted data to the display driving apparatus 120. It should be noted that the processing unit 130 only obtains the encrypted data stream from the network connecting apparatus 140 but does not decrypt it.

Thereafter, in step S406, the display driving apparatus 120 decrypts the digital content and the data stream according to the security key provided by the remote apparatus 200 and corresponding algorithms.

In step S408, the display driving apparatus 120 drives the display interface 110 according to the decrypted digital content so that the display interface 110 displays the digital content.

In the present embodiment, the data stream packet contains at least following information: information about the algorithm to be used for decrypting the digital content provided by the remote apparatus, information about the algorithm to be used for decrypting the security key provided by the remote apparatus, information about the algorithm to be used by the remote apparatus for encrypting or decrypting the security key provided by the display driving apparatus, information about the algorithm to be used by the remote apparatus and the display driving apparatus for encrypting or decrypting the data stream packet, and the desired digital content.

Additionally, in the present embodiment, the encryption or decryption algorithms of the display driving apparatus may or may not be renewable. When the display driving apparatus and the remote apparatus communicate with each other, the digital content or non-significant data that is not to be protected in the data stream may not be encrypted to reduce the bandwidth used for transmitting the data stream. For example, the digital content or non-significant data that is not to be protected may be error information, state information, or handshaking control. In addition, the display driving apparatus and the remote apparatus may communicate with each other by transmitting compressed or uncompressed data.

Moreover, the same algorithm or different algorithms may be adopted by the display driving apparatus and the remote apparatus for encrypting or decrypting aforementioned data. In the present embodiment, the encryption and decryption of the security key, the digital content, and the data stream are all executed by the display driving apparatus and the remote apparatus, and the processing unit 130 simply transmits the data related to the digital content and executes a transmission initiating procedure. Thus, even if the encrypted security key, the encrypted data stream, the encrypted digital content, or all of the three are captured by an unauthorized electronic apparatus, the algorithms used by the display driving apparatus 120 and the remote apparatus 200 for encrypting and decrypting foregoing data cannot be understood.

As to the electronic apparatus, the display driving apparatus provides at least one encryption/decryption algorithm and an exclusive security key. As to the remote apparatus, which has a complete encryption/decryption database, firewall, or antivirus system, and accordingly the algorithm to be used by any display driving apparatus of any electronic apparatus can be customized according to the actual requirement, so that the possibility of the digital content being cracked is reduced or the time and cost spent by an unauthorized electronic apparatus for cracking the digital content are increased.

In another embodiment, the security key of the digital content obtained from the remote system is stored in a specific memory device of the display driving apparatus so that the digital content can be browsed offline. For example, the display driving apparatus further includes a memory for storing the security key corresponding to the digital content such that a user can browse the digital content offline. Different digital contents are corresponding to the same security key or different security keys. The digital content may be encrypted and stored externally. Because the security key and the encryption algorithm are both stored in the display driving apparatus, the digital content is protected even if it is encrypted and stored in an external device and browsed offline.

Figure 7:
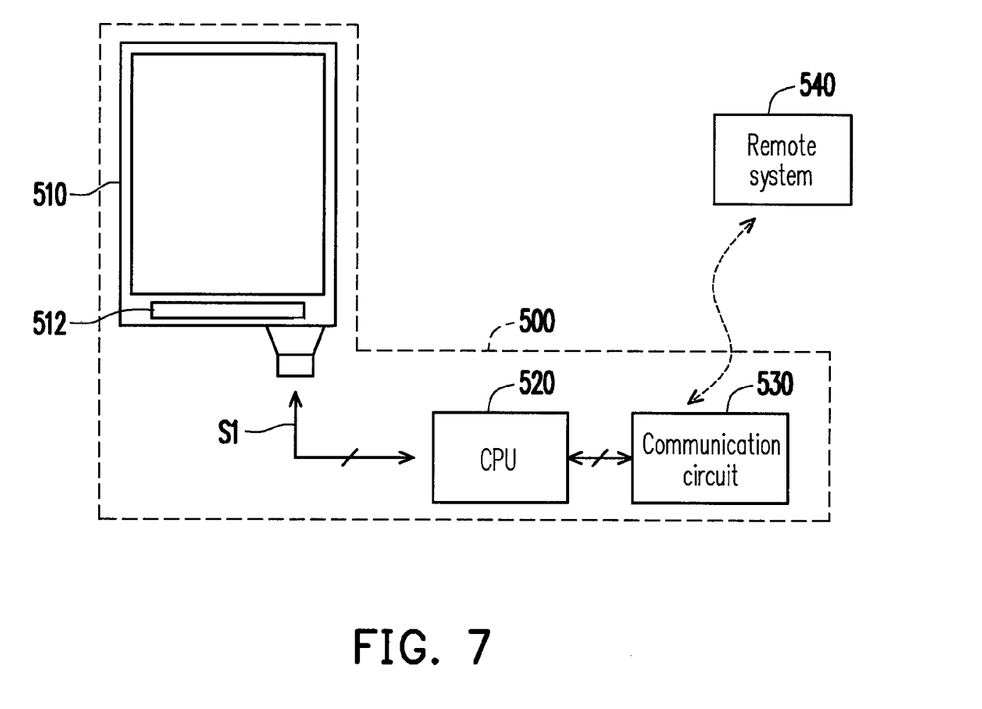
FIG. 7 is a diagram of an electronic apparatus with a digital content protection mechanism according to another embodiment of the invention.

FIG. 7 is a diagram of an electronic apparatus with a digital content protection mechanism according to another embodiment of the invention. Referring to FIG. 7, in the present embodiment, the electronic apparatus 500 includes a display apparatus 510, a CPU 520, and a communication circuit 530.

In the present embodiment, only a remote system 540 and the display driver chip 512 of the display apparatus 510 have the encryption/decryption algorithms and the security key encryption/decryption functions. Thus, even if an encrypted data received or transmitted by the CPU 520 is captured, the corresponding algorithm and security key for decrypting the data cannot be obtained, so that the security of digital contents is protected.

In the present embodiment, the CPU 520 directly sends the encrypted data stream received from the remote system 540 to the display apparatus 510 having the encryption/decryption algorithms. Thus, digital content to be protected is transmitted on the transmission path S1 between the CPU 520 and the display apparatus 510 in an encrypted form. However, display data may be transmitted in an unencrypted form in order to allow the invention to be applied to other applications.

Whether the encryption/decryption mechanism of the display apparatus 510 is started or not can be determined based on following factors:

(1) A hardware pin receives a special data, a special signal, a special voltage level, or a special current level.

(2) Special settings are done on one or multiple special registers of the display apparatus through a universal transmission interface.

(3) The CPU and the display apparatus identify a data in a special format transmitted through a universal serial transmission interface.

(4) The CPU and the display apparatus identify a data packet in a special format transmitted through the universal serial transmission interface.

(5) A state variation, frequency variation, or level variation in a signal transmitted through either a universal parallel transmission interface or a universal serial transmission interface is detected (6) A special interface transmission protocol is adopted.

(7) The display apparatus provides one or multiple exclusive encryption/decryption interfaces, and the external CPU directly inputs or outputs encrypted data stream through such an exclusive interface.

Figure 8:
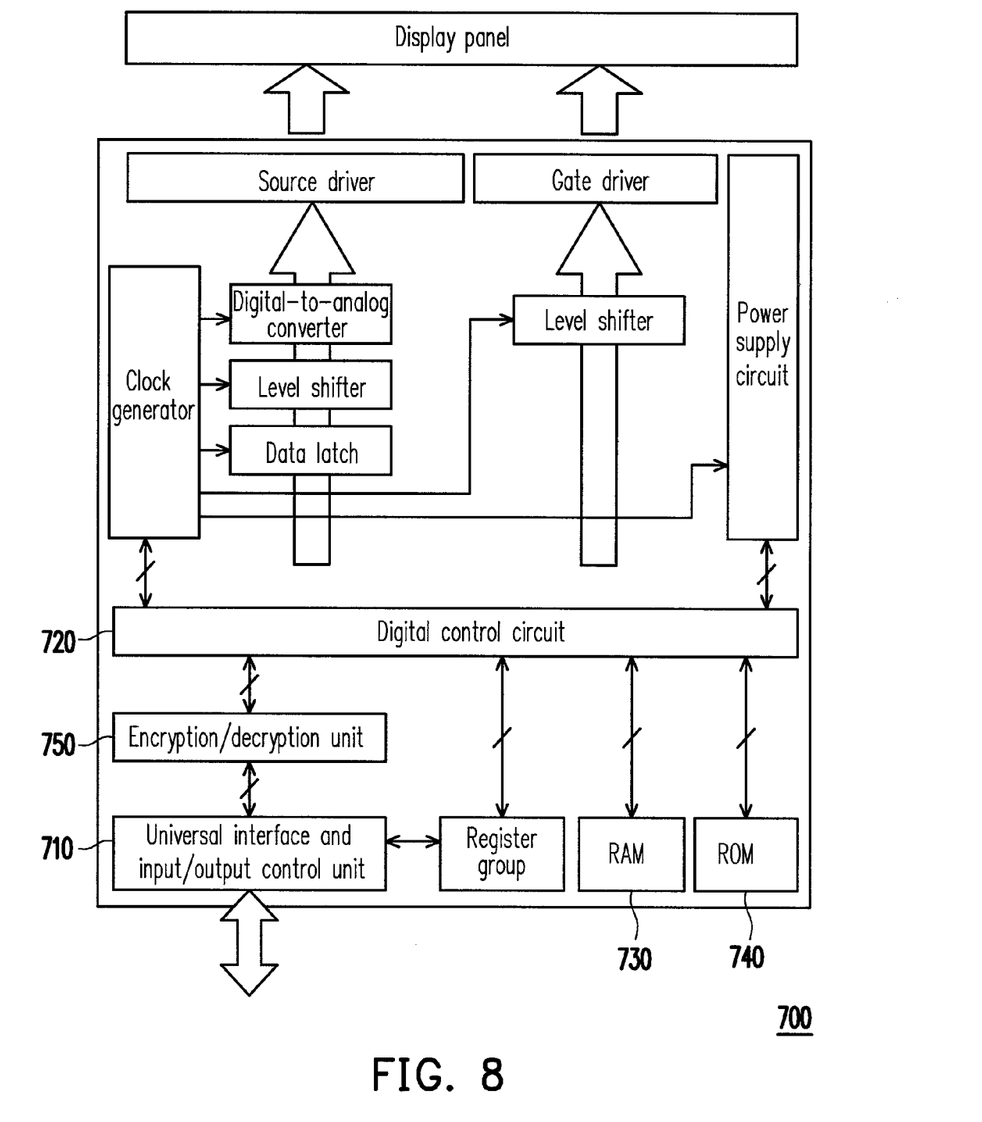
FIG. 8 is a diagram of a display driving apparatus with an encryption/decryption function according to an embodiment of the invention.

FIG. 8 is a diagram of a display driving apparatus with an encryption/decryption function according to an embodiment of the invention. Referring to FIG. 8, in the present embodiment, the encryption/decryption unit 750 may be disposed behind a universal interface and an input/output control unit 710. When the encryption/decryption unit 750 is started and an encrypted data is input by the input/output control unit 710 through the universal interface, the encrypted data is automatically sent to the encryption/decryption unit 750 to be decrypted. If the data input by the input/output control unit 710 through the universal interface is not encrypted or the encryption/decryption unit 750 is not started, the input data is not sent to the encryption/decryption unit 750.

Contrarily, when the encryption/decryption unit 750 is started and an internal digital control circuit 720 is about to send a special data back to the remote system, the data is first sent to the encryption/decryption unit 750 and then output by the input/output control unit 710 through the universal interface.

In addition, when an error occurs in the security key, the pattern, or the format of an encrypted data, the encryption/decryption unit 750 does not decrypt the data correctly so that the incorrect data or control code is prevented from entering the backend digital control circuit 720 or other circuits. Besides an error message may (or may not) be issued to the external CPU in an encrypted or unencrypted manner. Or, a special electrical characteristic variation may be issued through one or multiple pins of the display apparatus to notify an external hardware about the current error in the display apparatus.

If the encryption/decryption unit 750 is not started and the data input by the input/output control unit 710 through the universal interface is encrypted, no decryption operation is performed and the display apparatus does not display the digital content to be protected.

Figure 9:
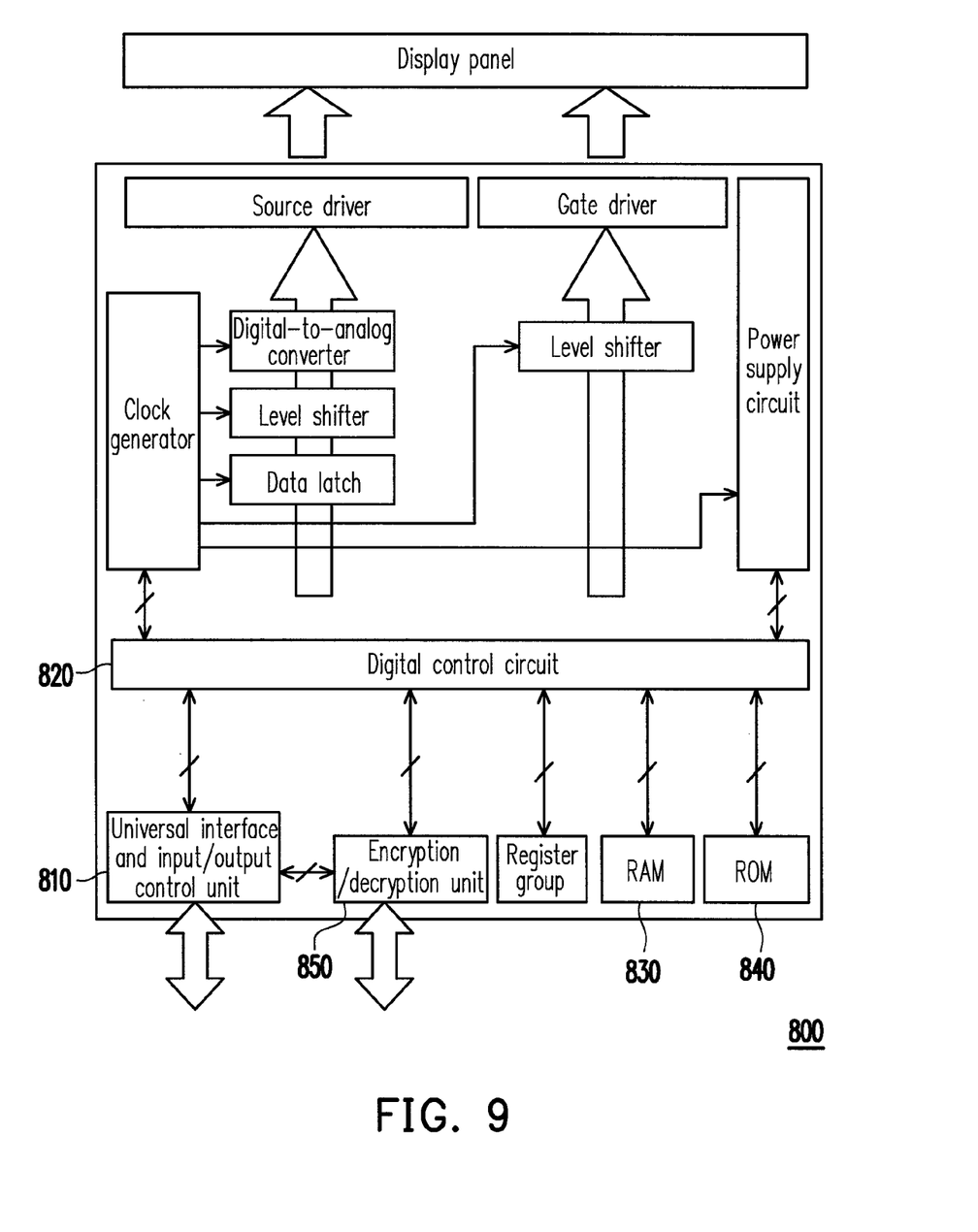
FIG. 9 is a diagram of a display driving apparatus with an encryption/decryption function according to another embodiment of the invention.

FIG. 9 is a diagram of a display driving apparatus with an encryption/decryption function according to another embodiment of the invention. Referring to FIG. 9, in the present embodiment, when the encryption/decryption unit 850 is started, the encrypted data can be input to the display driving apparatus 800 to be decrypted through another special interface.

Contrarily, when the encryption/decryption unit 850 is started and the internal digital control circuit 820 is about to send a special data back to the remote system, the data is first sent to the encryption/decryption unit 850 and then directly output through the special interface.

Additionally, when an error occurs in the security key, the pattern, or the format of the encrypted data, the encryption/decryption unit 850 does not decrypt the data correctly, so that the incorrect data or control code is prevented from entering the backend digital control circuit 820 or other circuits.

When the encryption/decryption unit 850 is not started, no decryption operation is performed even though the data input through the special interface is encrypted.

Figure 10:
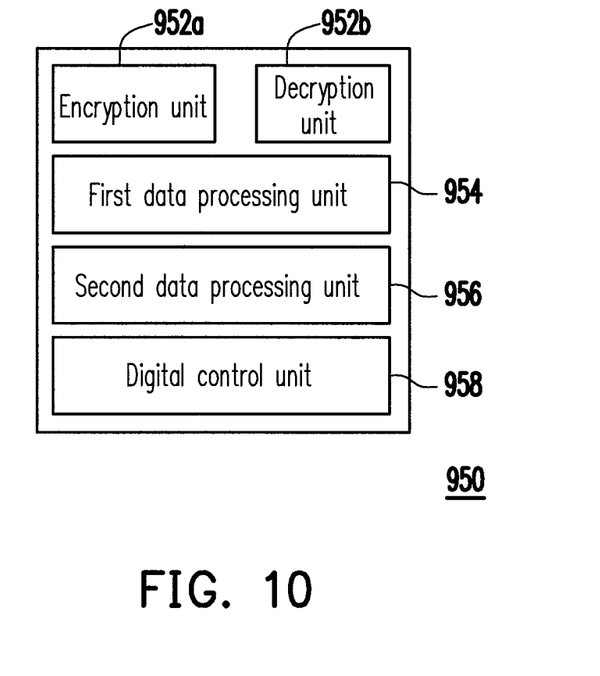
FIG. 10 is a schematic block diagram of an encryption/decryption unit according to an embodiment of the invention.

FIG. 10 is a schematic block diagram of an encryption/decryption unit according to an embodiment of the invention. Referring to FIG. 10, in the present embodiment, the encryption/decryption unit 950 may include an encryption unit 952*a*, a decryption unit 952*b*, a first data processing unit 954, a second data processing unit 956, and a digital control unit 958. The first data processing unit 954 compresses or decompresses data, and the second data processing unit 956 determines the pattern of an input encrypted data and reformats an output encrypted data.

When the encryption unit 952*a* and the decryption unit 952*b* are started and an encrypted data is input into the encryption unit 952*a* and the decryption unit 952*b*, the second data processing unit 956 first determines whether the format of the input data conforms to the pattern of the encrypted data or corrects the input data. If the pattern of the encrypted data is unknown or the input data cannot be corrected according to an error correcting code (ECC), the digital control unit 958 takes an appropriate action accordingly (for example, sends an error message back, outputs a special signal, or instructs the display apparatus not to display).

When the pattern of the input data is determined to be a correct pattern, if the data is compressed, the first data processing unit 954 decompresses the data. Otherwise, if the data is not compressed, the data is sent to the encryption unit 952*a* and the decryption unit 952*b*. Thus, the data compression and decompression function is not compulsory.

Contrarily, when the display driving apparatus 950 is about to output a data to be protected, the data output by the display driving apparatus 950 is still sent to the second data processing unit 956 so as to determine the format of the data. After the encryption unit 952*a* encrypts the data, the first data processing unit 954 compresses the data. In addition, in order to prevent data error, an ECC encoding function may be further added to the encryption/decryption unit 950. Finally, the second data processing unit 956 recomposes the data generated by foregoing units so that the external remote system can identify and decrypt the data, wherein the method and order for recomposing the data are not limited in the invention.

In summary, according to an embodiment of the invention, before an electronic apparatus downloads a digital content, the electronic apparatus provides the identification information of a display driving apparatus to a remote apparatus, so that the remote apparatus encrypts the digital content according to an algorithm corresponding to the identification information and the digital content is prevented from being cracked. Thereby, the digital content display method provided by an embodiment of the invention can protect a digital content from being misappropriated by any authorized electronic apparatus, so that a DRM purpose can accomplished.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A digital content display method, adapted to an electronic apparatus, wherein the electronic apparatus comprises a display interface and a display driving apparatus, the digital content display method comprising:
   receiving an encrypted digital content by the display driving apparatus;
   decrypting the digital content according to a first algorithm by the display driving apparatus; and
   driving the display interface of the electronic apparatus according to the decrypted digital content by the display driving apparatus, so as to allow the display interface to display the digital content,
   wherein before the step of receiving the encrypted digital content, the digital content display method further comprises:
   providing an identification information to a remote apparatus by the display driving apparatus, wherein the identification information is corresponding to the display driving apparatus, and the remote apparatus encrypts the digital content according to the first algorithm corresponding to the identification information and provides the encrypted digital content to the display driving apparatus,
   wherein before the step of providing the identification information to the remote apparatus, the digital content display method further comprises:
   encrypting the identification information by the display driving apparatus, wherein in the step of providing the identification information to the remote apparatus, the encrypted identification information and a security key are provided to the remote apparatus by the display driving apparatus, wherein the remote apparatus decrypts the identification information by the security key,
   wherein before the step of providing the encrypted identification information and the security key to the remote apparatus, the digital content display method further comprises:
   encrypting the security key by the display driving apparatus, wherein in the step of providing the identification information to the remote apparatus, the encrypted identification information and the encrypted security key are provided to the remote apparatus by the display driving apparatus, wherein the remote apparatus decrypts the security key according to a second algorithm, and
   wherein before the step of providing the encrypted identification information and the encrypted security key to the remote apparatus, the digital content display method further comprises:
   converting the encrypted identification information and the encrypted security key into a data stream by the display driving apparatus, wherein in the step of providing the identification information to the remote apparatus, the data stream is provided to the remote apparatus by the display driving apparatus.

2. The digital content display method according to claim 1, wherein before the step of providing the data stream to the remote apparatus, the digital content display method further comprises:
   encrypting the data stream by the display driving apparatus, wherein in the step of providing the identification information to the remote apparatus, the encrypted data stream is provided to the remote apparatus by the display driving apparatus, wherein the remote apparatus decrypts the data stream according to a third algorithm.

3. The digital content display method according to claim 2, wherein the display driving apparatus comprises a memory, and the digital content display method further comprises:
   storing the security key corresponding to the digital content by the memory, so as to allow a user to browse the digital content offline.

4. The digital content display method according to claim 1, wherein the electronic apparatus further comprises a processing unit and a network connecting apparatus, and before the step of providing the identification information to the remote apparatus, the digital content display method further comprises:
   establishing a connection with the remote apparatus by the network connecting apparatus; and
   requesting the display driving apparatus to provide the identification information by the processing unit, wherein in the step of providing the identification information to the remote apparatus, the identification information is provided to the remote apparatus by the processing unit and the network connecting apparatus.

5. A hardware electronic apparatus, adapted to display a decrypted digital content, the hardware electronic apparatus comprising:
   a hardware display interface displaying the digital content; and
   a hardware display driving apparatus receiving the encrypted digital content, decrypting the digital content according to a first algorithm, and driving the hardware display interface according to the decrypted digital content, so as to allow the hardware display interface to display the digital content,
   wherein the hardware display driving apparatus provides an identification information to the remote apparatus, the identification information is corresponding to the hardware display driving apparatus, and the remote apparatus encrypts the digital content according to the first algorithm corresponding to the identification information and provides the encrypted digital content to the hardware display driving apparatus,
   wherein the hardware display driving apparatus encrypts the identification information, when the hardware display driving apparatus provides the identification information to the remote apparatus, the hardware display driving apparatus provides the encrypted identification information and a security key to the remote apparatus, and the remote apparatus decrypts the identification information by the security key,
   wherein the hardware display driving apparatus encrypts the security key, when the hardware display driving apparatus provides the identification information to the remote apparatus, the hardware display driving apparatus provides the encrypted identification information and the encrypted security key to the remote apparatus, and the remote apparatus decrypts the security key according to a second algorithm, and wherein the hardware display driving apparatus converts the encrypted identification information and the encrypted security key into a data stream, and when the hardware display driving apparatus provides the identification information to the remote apparatus, the hardware display driving apparatus provides the data stream to the remote apparatus.

6. The hardware electronic apparatus according to claim 5, wherein the hardware display driving apparatus encrypts the data stream, when the hardware display driving apparatus provides the identification information to the remote apparatus, the hardware display driving apparatus provides the encrypted data stream to the remote apparatus, and the remote apparatus decrypts the data stream according to a third algorithm.

7. The hardware electronic apparatus according to claim 6, wherein the hardware display driving apparatus comprises a memory storing the security key corresponding to the digital content, so as to allow a user to browse the digital content offline.

8. The hardware electronic apparatus according to claim 5 further comprising:
   a hardware network connecting apparatus establishing a connection with the remote apparatus; and
   a processing circuit requesting the hardware display driving apparatus to provide the identification information and requesting the network connecting apparatus to establish the connection with the remote apparatus.

9. A hardware display driving apparatus, adapted to drive a display interface to display a decrypted digital content, the hardware display driving apparatus comprising:
   an encryption/decryption circuit receiving an encrypted digital content and decrypting the digital content according to a first algorithm; and
   a display driving circuit driving the display interface according to the decrypted digital content, so as to allow the display interface to display the digital content,
   wherein the encryption/decryption circuit provides an identification information to the remote apparatus, the identification information is corresponding to the hardware display driving apparatus, and the remote apparatus encrypts the digital content according to the first algorithm corresponding to the identification information and provides the encrypted digital content to the hardware display driving apparatus,
   wherein the encryption/decryption circuit encrypts the identification information, when the encryption/decryption circuit provides the identification information to the remote apparatus, the encryption/decryption circuit provides the encrypted identification information and a security key to the remote apparatus, and the remote apparatus decrypts the identification information by the security key,
   wherein the encryption/decryption circuit encrypts the security key, when the encryption/decryption circuit provides the identification information to the remote apparatus, the encryption/decryption circuit provides the encrypted identification information and the encrypted security key to the remote apparatus, and the remote apparatus decrypts the security key according to a second algorithm,
   wherein the encryption/decryption circuit converts the encrypted identification information and the encrypted security key into a data stream, and when the encryption/decryption circuit provides the identification information to the remote apparatus, the encryption/decryption circuit provides the data stream to the remote apparatus.

10. The hardware display driving apparatus according to claim 9, wherein the encryption/decryption circuit encrypts the data stream, when the encryption/decryption circuit provides the identification information to the remote apparatus, the encryption/decryption circuit provides the encrypted data stream to the remote apparatus, and the remote apparatus decrypts the data stream according to a third algorithm.

11. The hardware display driving apparatus according to claim 10 further comprising:
   a memory storing the security key corresponding to the digital content so as to allow a user to browse the digital content offline.

* * * * *